United States Patent
Kim et al.

(10) Patent No.: US 9,839,066 B2
(45) Date of Patent: Dec. 5, 2017

(54) PDCCH MONITORING REGARDLESS OF DRX CONFIGURATION

(71) Applicant: LG ELECTRONICS INC., Seoul (KR)

(72) Inventors: Sangwon Kim, Seoul (KR); Youngdae Lee, Seoul (KR); Sunghoon Jung, Seoul (KR)

(73) Assignee: LG Electronics Inc., Seoul (KR)

( * ) Notice: Subject to any disclaimer, the term of this patent is extended or adjusted under 35 U.S.C. 154(b) by 216 days.

(21) Appl. No.: 14/759,103

(22) PCT Filed: Jan. 15, 2014

(86) PCT No.: PCT/KR2014/000424
§ 371 (c)(1),
(2) Date: Jul. 2, 2015

(87) PCT Pub. No.: WO2014/119860
PCT Pub. Date: Aug. 7, 2014

(65) Prior Publication Data
US 2015/0359034 A1    Dec. 10, 2015

Related U.S. Application Data

(60) Provisional application No. 61/758,713, filed on Jan. 30, 2013, provisional application No. 61/758,764, filed on Jan. 30, 2013.

(51) Int. Cl.
*H04W 4/00*     (2009.01)
*H04W 76/04*    (2009.01)
*H04W 24/10*    (2009.01)

(52) U.S. Cl.
CPC ......... *H04W 76/048* (2013.01); *H04W 24/10* (2013.01)

(58) Field of Classification Search
USPC .......... 370/252–280, 311–329; 455/450–552
See application file for complete search history.

(56) References Cited

U.S. PATENT DOCUMENTS

| | | | | |
|---|---|---|---|---|
| 8,254,323 | B2* | 8/2012 | Chun | H04W 72/1289 370/241 |
| 8,626,167 | B2* | 1/2014 | Futaki | H04W 36/0055 455/436 |
| 8,804,556 | B2* | 8/2014 | Bae | H04W 36/0083 370/241 |
| 8,818,321 | B2* | 8/2014 | Dalsgaard | H04W 52/0229 370/328 |
| 8,874,116 | B2* | 10/2014 | Kazmi | H04W 36/0088 455/437 |
| 9,332,456 | B2* | 5/2016 | Heo | H04W 52/0258 |
| 2007/0291729 | A1 | 12/2007 | Dalsgaard et al. | |
| 2010/0135159 | A1 | 6/2010 | Chun et al. | |
| 2010/0317345 | A1 | 12/2010 | Futaki et al. | |

(Continued)

*Primary Examiner* — Man Phan
(74) *Attorney, Agent, or Firm* — Birch, Stewart, Kolasch & Birch, LLP

(57) ABSTRACT

PDCCH (Physical Downlink Control Channel) monitoring operation regardless of the DRX configuration is disclosed. The UE operating in a wireless communication system receives DRX (Discontinuous Reception) configuration information from a network. When the UE transmits a specific indication, the UE ignores the DRX configuration information and monitor a PD-CCCH after transmitting the specific indication.

14 Claims, 11 Drawing Sheets

(56) References Cited

U.S. PATENT DOCUMENTS

| | | |
|---|---|---|
| 2012/0155309 A1 | 6/2012 | Bae |
| 2012/0300651 A1 | 11/2012 | Kazmi |
| 2014/0029459 A1* | 1/2014 | Kwon ................. H04W 76/048 370/252 |
| 2015/0319744 A1* | 11/2015 | Jung .................... H04W 24/10 370/328 |

* cited by examiner

FIG. 4
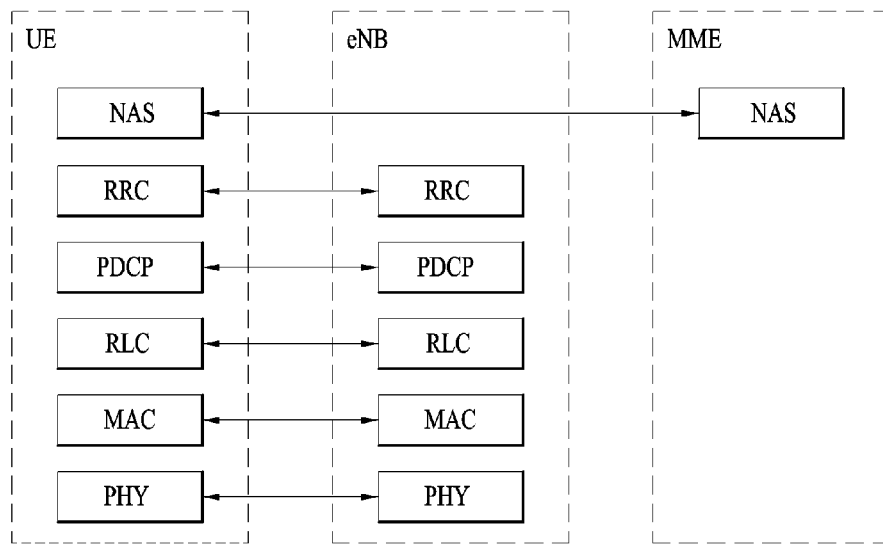
(a) contol - plane protocol stack
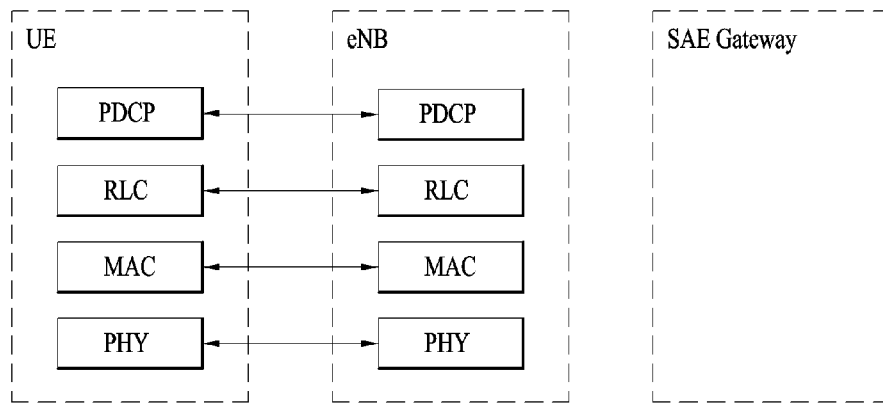
(b) user - plane protocol stack

PDCCH MONITORING REGARDLESS OF DRX CONFIGURATION

CROSS REFERENCE TO RELATED APPLICATIONS

This application is the National Phase of PCT International Application No. PCT/KR2014/000424, filed on Jan. 15, 2014, which claims priority under 35 U.S.C. 119(e) to U.S. Provisional Application Nos. 61/758,713, filed on Jan. 30, 2013 and 61/758,764, filed on Jan. 30, 2013, all of which are hereby expressly incorporated by reference into the present application.

TECHNICAL FIELD

The present invention relates to a wireless communication system, and more particularly, to methods for a PDCCH (Physical Downlink Control Channel) monitoring regardless of DRX (Discontinuous Reception) configuration and apparatuses therefor.

BACKGROUND ART

As an example of a wireless communication system to which the present invention is applicable, a 3rd generation partnership project (3GPP) long term evolution (LTE) communication system will be schematically described.

FIG. 1 is a schematic diagram showing a network structure of an evolved universal mobile telecommunications system (E-UMTS) as an example of a wireless communication system. The E-UMTS is an evolved form of the legacy UMTS and has been standardized in the 3GPP. In general, the E-UMTS is also called an LTE system. For details of the technical specification of the UMTS and the E-UMTS, refer to Release 7 and Release 8 of "3rd Generation Partnership Project; Technical Specification Group Radio Access Network".

Referring to FIG. 1, the E-UMTS includes a user equipment (UE), an evolved node B (eNode B or eNB), and an access gateway (AG) which is located at an end of an evolved UMTS terrestrial radio access network (E-UTRAN) and connected to an external network. The eNB may simultaneously transmit multiple data streams for a broadcast service, a multicast service and/or a unicast service.

One or more cells may exist per eNB. The cell is set to operate in one of bandwidths such as 1.25, 2.5, 5, 10, 15, and 20 MHz and provides a downlink (DL) or uplink (UL) transmission service to a plurality of UEs in the bandwidth. Different cells may be set to provide different bandwidths. The eNB controls data transmission or reception to and from a plurality of UEs. The eNB transmits DL scheduling information of DL data to a corresponding UE so as to inform the UE of a time/frequency domain in which the DL data is supposed to be transmitted, coding, a data size, and hybrid automatic repeat and request (HARQ)-related information. In addition, the eNB transmits UL scheduling information of UL data to a corresponding UE so as to inform the UE of a time/frequency domain which may be used by the UE, coding, a data size, and HARQ-related information. An interface for transmitting user traffic or control traffic may be used between eNBs. A core network (CN) may include the AG and a network node or the like for user registration of UEs. The AG manages the mobility of a UE on a tracking area (TA) basis. One TA includes a plurality of cells.

Although wireless communication technology has been developed to LTE based on wideband code division multiple access (WCDMA), the demands and expectations of users and service providers are on the rise. In addition, considering other radio access technologies under development, new technological evolution is required to secure high competitiveness in the future. Decrease in cost per bit, increase in service availability, flexible use of frequency bands, a simplified structure, an open interface, appropriate power consumption of UEs, and the like are required.

DISCLOSURE

Technical Problem

Accordingly, the present invention is directed to methods for a PDCCH (Physical Downlink Control Channel) monitoring regardless of DRX (Discontinuous Reception) configuration apparatuses therefor that substantially obviates one or more problems due to limitations and disadvantages of the related art.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

Technical Solution

To achieve these objects and other advantages and in accordance with the purpose of the invention, as embodied and broadly described herein, a method for a user equipment (UE) to operate in a wireless communication system, the method comprising: receiving DRX (Discontinuous Reception) configuration information from a network; and ignoring the DRX configuration information and monitoring a PDCCH (Physical Downlink Control Channel) after transmitting a specific indication, is provided.

In another aspect of the present invention, a user equipment (UE) comprising: a transceiver adapted to receive DRX (Discontinuous Reception) configuration information from a network over the air; and a processor connected to the transceiver and adapted to control the transceiver to ignore the DRX configuration information and monitor a PDCCH (Physical Downlink Control Channel) after transmitting a specific indication, is provided.

The above monitoring the PDCCH can be performed during a specified period of time in addition to an active time according to the DRX configuration information. And, the specific indication can be a measurement report.

The above explained ignoring the DRX configuration information and the monitoring the PDCCH may be performed only after transmitting a measurement report triggered by a specific type of neighbor. The specific type of neighbor cell can be configured by a network through a RRC signal, and it can be a macro neighboring cell.

The above explained ignoring the DRX configuration information and the monitoring the PDCCH may be performed only after transmitting a measurement report triggered by a specific measurement object or objects. The specific measurement object or objects can be configured by a network through a RRC signal.

The above explained ignoring the DRX configuration information and the monitoring the PDCCH may be performed only after transmitting a measurement report to a specific type of serving cell. The specific type of serving cell can be configured by a network through a RRC signal, and it can be a non-macro serving cell.

Also, the above explained ignoring the DRX configuration information and the monitoring the PDCCH may be performed only after transmitting a measurement report triggered by a specific type of neighbor cell to a specific type of serving cell. Both of these can be configured by RRC signaling and they can be a macro neighboring cell and a non-macro serving cell, respectively.

The above method may further comprises: receiving configuration information for the ignoring the DRX configuration information and the monitoring the PDCCH from the network, and in this case, the configuration information may comprise (i) criteria for the specific indication and (ii) time period for said ignoring the DRX configuration information and said monitoring the PDCCH. Here, the criteria may be the specific indication being a measurement report triggered by a first event where a neighboring cell becomes a predetermined offset better than a serving cell, or a second event where a neighboring cell becomes better than a predetermined threshold.

Also, the DRX configuration information can be for an on-duration timer, a DRX inactivity timer, and a DRX retransmission timer. Preferably, the above explained ignoring the DRX configuration may comprise ignoring configuration for the on-duration timer, the DRX inactivity timer, and the DRX retransmission timer.

Advantageous Effects

According to embodiments of the present invention, the network and the user equipment can efficiently transmit and receive signals in a wireless communication system.

It is to be understood that both the foregoing general description and the following detailed description of the present invention are exemplary and explanatory and are intended to provide further explanation of the invention as claimed.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention.

FIG. 4 is a diagram showing a control plane and a user plane of a radio interface protocol between a UE and an E-UTRAN based on a 3GPP radio access network standard.

BEST MODE

The configuration, operation and other features of the present invention will be understood by the embodiments of the present invention described with reference to the accompanying drawings. The following embodiments are examples of applying the technical features of the present invention to a 3rd generation partnership project (3GPP) system.

Although the embodiments of the present invention are described using a long term evolution (LTE) system and a LTE-advanced (LTE-A) system in the present specification, they are purely exemplary. Therefore, the embodiments of the present invention are applicable to any other communication system corresponding to the above definition. In addition, although the embodiments of the present invention are described based on a frequency division duplex (FDD) scheme in the present specification, the embodiments of the present invention may be easily modified and applied to a half-duplex FDD (H-FDD) scheme or a time division duplex (TDD) scheme.

Figure 1:
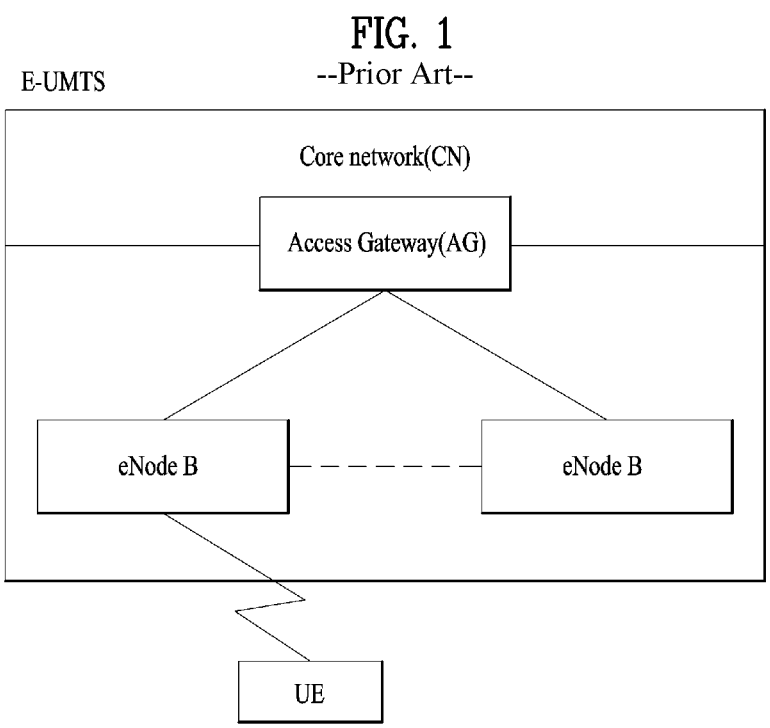
FIG. 1 is a diagram showing a network structure of an Evolved Universal Mobile Telecommunications System (E-UMTS) as an example of a wireless communication system.
Figure 2:
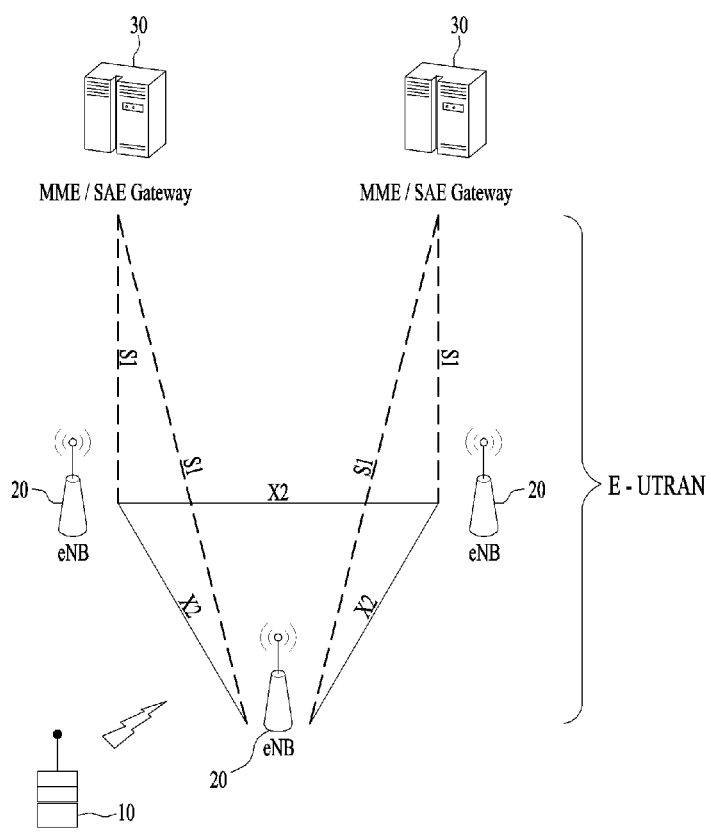
FIG. 2 is a block diagram illustrating network structure of an evolved universal mobile telecommunication system (E-UMTS).

FIG. 2 is a block diagram illustrating network structure of an evolved universal mobile telecommunication system (E-UMTS).

The E-UMTS may be also referred to as an LTE system. The communication network is widely deployed to provide a variety of communication services such as voice (VoIP) through IMS and packet data.

As illustrated in FIG. 2, the E-UMTS network includes an evolved UMTS terrestrial radio access network (E-UTRAN), an Evolved Packet Core (EPC) and one or more user equipment. The E-UTRAN may include one or more evolved NodeB (eNodeB) 20, and a plurality of user equipment (UE) 10 may be located in one cell. One or more E-UTRAN mobility management entity (MME)/system architecture evolution (SAE) gateways 30 may be positioned at the end of the network and connected to an external network.

As used herein, "downlink" refers to communication from eNodeB 20 to UE 10, and "uplink" refers to communication from the UE to an eNodeB. UE 10 refers to communication equipment carried by a user and may be also referred to as a mobile station (MS), a user terminal (UT), a subscriber station (SS) or a wireless device.

An eNodeB 20 provides end points of a user plane and a control plane to the UE 10. MME/SAE gateway 30 provides an end point of a session and mobility management function for UE 10. The eNodeB and MME/SAE gateway may be connected via an S1 interface.

The eNodeB 20 is generally a fixed station that communicates with a UE 10, and may also be referred to as a base station (BS) or an access point. One eNodeB 20 may be deployed per cell. An interface for transmitting user traffic or control traffic may be used between eNodeBs 20.

The MME provides various functions including NAS signalling to eNodeBs 20, NAS signalling security, AS Security control, Inter CN node signalling for mobility between 3GPP access networks, Idle mode UE Reachability (including control and execution of paging retransmission), Tracking Area list management (for UE in idle and active mode), PDN GW and Serving GW selection, MME selection for handovers with MME change, SGSN selection for handovers to 2G or 3G 3GPP access networks, Roaming, Authentication, Bearer management functions including dedicated bearer establishment, Support for PWS (which includes ETWS and CMAS) message transmission. The SAE gateway host provides assorted functions including Per-user based packet filtering (by e.g. deep packet inspection), Lawful Interception, UE IP address allocation, Transport level packet marking in the downlink, UL and DL service level charging, gating and rate enforcement, DL rate enforcement based on APN-AMBRFor clarity MME/SAE gateway 30 will be referred to herein simply as a "gateway," but it is understood that this entity includes both an MME and an SAE gateway.

A plurality of nodes may be connected between eNodeB 20 and gateway 30 via the S1 interface. The eNodeBs 20 may be connected to each other via an X2 interface and neighboring eNodeBs may have a meshed network structure that has the X2 interface.

Figure 3:
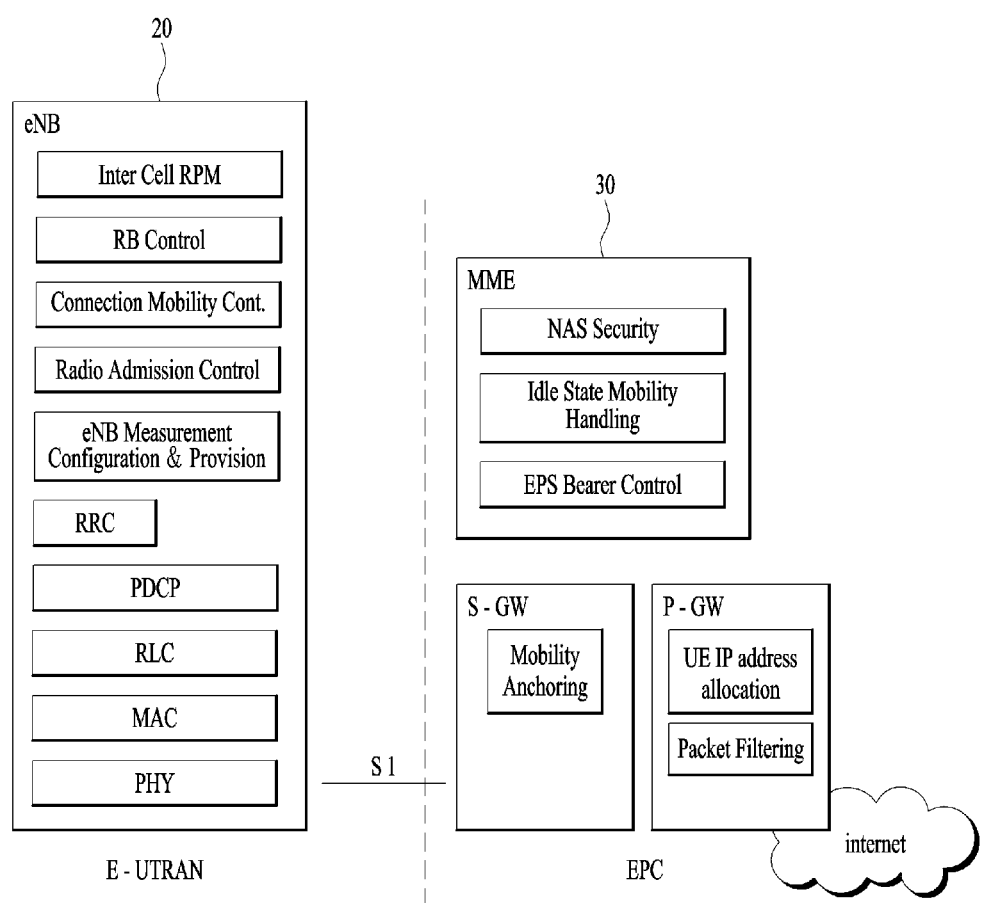
FIG. 3 is a block diagram depicting architecture of a typical E-UTRAN and a typical EPC.

FIG. 3 is a block diagram depicting architecture of a typical E-UTRAN and a typical EPC.

As illustrated, eNodeB 20 may perform functions of selection for gateway 30, routing toward the gateway during a Radio Resource Control (RRC) activation, scheduling and transmitting of paging messages, scheduling and transmitting of Broadcast Channel (BCCH) information, dynamic allocation of resources to UEs 10 in both uplink and downlink, configuration and provisioning of eNodeB measurements, radio bearer control, radio admission control (RAC), and connection mobility control in LTE_ACTIVE state. In the EPC, and as noted above, gateway 30 may perform functions of paging origination, LTE-IDLE state management, ciphering of the user plane, System Architecture Evolution (SAE) bearer control, and ciphering and integrity protection of Non-Access Stratum (NAS) signaling.

FIG. 4 is a diagram showing a control plane and a user plane of a radio interface protocol between a UE and an E-UTRAN based on a 3GPP radio access network standard.

The control plane refers to a path used for transmitting control messages used for managing a call between the UE and the E-UTRAN. The user plane refers to a path used for transmitting data generated in an application layer, e.g., voice data or Internet packet data.

A physical (PHY) layer of a first layer provides an information transfer service to a higher layer using a physical channel. The PHY layer is connected to a medium access control (MAC) layer located on the higher layer via a transport channel. Data is transported between the MAC layer and the PHY layer via the transport channel. Data is transported between a physical layer of a transmitting side and a physical layer of a receiving side via physical channels. The physical channels use time and frequency as radio resources. In detail, the physical channel is modulated using an orthogonal frequency division multiple access (OFDMA) scheme in downlink and is modulated using a single carrier frequency division multiple access (SC-FDMA) scheme in uplink.

The MAC layer of a second layer provides a service to a radio link control (RLC) layer of a higher layer via a logical channel. The RLC layer of the second layer supports reliable data transmission. A function of the RLC layer may be implemented by a functional block of the MAC layer. A packet data convergence protocol (PDCP) layer of the second layer performs a header compression function to reduce unnecessary control information for efficient transmission of an Internet protocol (IP) packet such as an IP version 4 (IPv4) packet or an IP version 6 (IPv6) packet in a radio interface having a relatively small bandwidth.

A radio resource control (RRC) layer located at the bottom of a third layer is defined only in the control plane. The RRC layer controls logical channels, transport channels, and physical channels in relation to configuration, re-configuration, and release of radio bearers (RBs). An RB refers to a service that the second layer provides for data transmission between the UE and the E-UTRAN. To this end, the RRC layer of the UE and the RRC layer of the E-UTRAN exchange RRC messages with each other.

One cell of the eNB is set to operate in one of bandwidths such as 1.25, 2.5, 5, 10, 15, and 20 MHz and provides a downlink or uplink transmission service to a plurality of UEs in the bandwidth. Different cells may be set to provide different bandwidths.

Downlink transport channels for transmission of data from the E-UTRAN to the UE include a broadcast channel (BCH) for transmission of system information, a paging channel (PCH) for transmission of paging messages, and a downlink shared channel (SCH) for transmission of user traffic or control messages. Traffic or control messages of a downlink multicast or broadcast service may be transmitted through the downlink SCH and may also be transmitted through a separate downlink multicast channel (MCH).

Uplink transport channels for transmission of data from the UE to the E-UTRAN include a random access channel (RACH) for transmission of initial control messages and an uplink SCH for transmission of user traffic or control messages. Logical channels that are defined above the transport channels and mapped to the transport channels include a broadcast control channel (BCCH), a paging control channel (PCCH), a common control channel (CCCH), a multicast control channel (MCCH), and a multicast traffic channel (MTCH).

Figure 5:
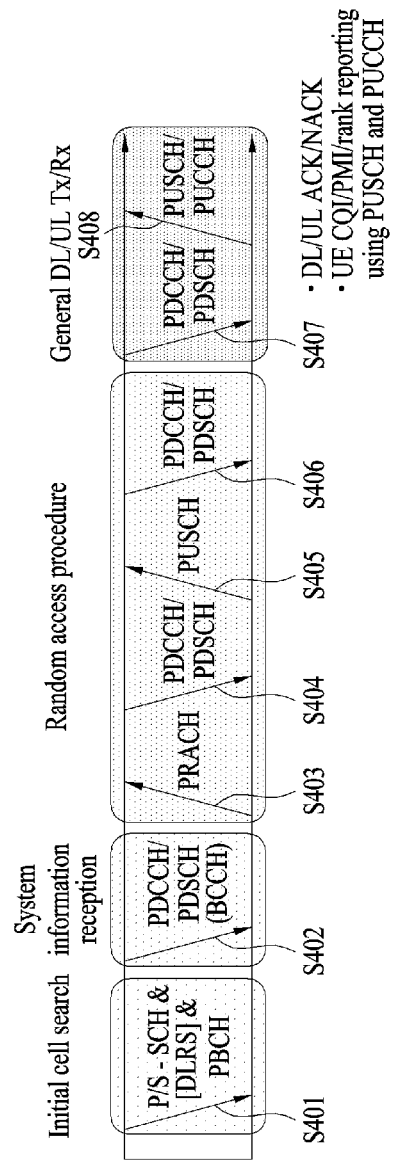
FIG. 5 is a diagram showing physical channels used in a 3GPP system and a general signal transmission method using the same.

FIG. 5 is a diagram showing physical channels used in a 3GPP system and a general signal transmission method using the same.

When a UE is powered on or enters a new cell, the UE performs an initial cell search operation such as synchronization with an eNB (S401). To this end, the UE may receive a primary synchronization channel (P-SCH) and a secondary synchronization channel (S-SCH) from the eNB to perform synchronization with the eNB and acquire information such as a cell ID. Then, the UE may receive a physical broadcast channel from the eNB to acquire broadcast information in the cell. During the initial cell search operation, the UE may receive a downlink reference signal (DL RS) so as to confirm a downlink channel state.

After the initial cell search operation, the UE may receive a physical downlink control channel (PDCCH) and a physical downlink control channel (PDSCH) based on information included in the PDCCH to acquire more detailed system information (S402).

When the UE initially accesses the eNB or has no radio resources for signal transmission, the UE may perform a random access procedure (RACH) with respect to the eNB (steps S403 to S406). To this end, the UE may transmit a specific sequence as a preamble through a physical random access channel (PRACH) (S403) and receive a response message to the preamble through the PDCCH and the PDSCH corresponding thereto (S404). In the case of contention-based RACH, the UE may further perform a contention resolution procedure.

After the above procedure, the UE may receive PDCCH/PDSCH from the eNB (S407) and may transmit a physical uplink shared channel (PUSCH)/physical uplink control channel (PUCCH) to the eNB (S408), which is a general uplink/downlink signal transmission procedure. Particularly, the UE receives downlink control information (DCI) through the PDCCH. Here, the DCI includes control information such as resource allocation information for the UE. Different DCI formats are defined according to different usages of DCI.

Control information transmitted from the UE to the eNB in uplink or transmitted from the eNB to the UE in downlink includes a downlink/uplink acknowledge/negative acknowledge (ACK/NACK) signal, a channel quality indicator (CQI), a precoding matrix index (PMI), a rank indicator (RI), and the like. In the case of the 3GPP LTE system, the UE may transmit the control information such as CQI/PMI/RI through the PUSCH and/or the PUCCH.

Figure 6:
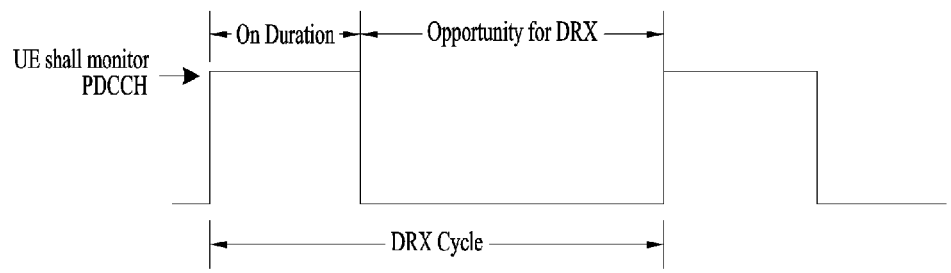
FIG. 6 is a diagram showing a concept DRX (Discontinuous Reception).

FIG. 6 is a diagram showing a concept DRX (Discontinuous Reception).

Referring to FIG. 6, if DRX is set for a UE in RRC_CONNECTED state, the UE attempts to receive a downlink channel, PDCCH, that is, performs PDCCH monitoring only during a predetermined time period, while the UE does not perform PDCCH monitoring during the remaining time period. A time period during which the UE should monitor a PDCCH is referred to as "On Duration". One On Duration is defined per DRX cycle. That is, a DRX cycle is a repetition period of On Duration.

The UE always monitors a PDCCH during On Duration in one DRX cycle and a DRX cycle determines a period in which On Duration is set. DRX cycles are classified into a long DRX cycle and a short DRX cycle according to the periods of the DRX cycles. The long DRX cycle may minimize the battery consumption of a UE, whereas the short DRX cycle may minimize a data transmission delay.

When the UE receives a PDCCH during On Duration in a DRX cycle, an additional transmission or a retransmission may take place during a time period other than the On Duration. Therefore, the UE should monitor a PDCCH during a time period other than the On Duration. That is, the UE should perform PDCCH monitoring during a time period over which an inactivity managing timer, drx-InactivityTimer or a retransmission managing timer, drx-RetransmissionTimer as well as an On Duration managing timer, onDurationTimer is running.

The value of each of the timers is defined as the number of subframes. The number of subframes is counted until the value of a timer is reached. If the value of the timer is satisfied, the timer expires. The current LTE standard defines drx-InactivityTimer as a number of consecutive PDCCH-subframes after successfully decoding a PDCCH indicating an initial UL or DL user data transmission and defines drx-RetransmissionTimer as a maximum number of consecutive PDCCH-subframes for as soon as a DL retransmission is expected by the UE.

Additionally, the UE should perform PDCCH monitoring during random access or when the UE transmits a scheduling request and attempts to receive a UL grant.

A time period during which a UE should perform PDCCH monitoring is referred to as an Active Time. The Active Time includes On Duration during which a PDCCH is monitored periodically and a time interval during which a PDCCH is monitored upon generation of an event.

More specifically, the Active Time includes the time while (1) onDurationTimer or drx-InactivityTimer or drx-RetransmissionTimer or mac-ContentionResolutionTimer is running, or (2) a Scheduling Request is sent on PUCCH and is pending, or (3) an uplink grant for a pending HARQ retransmission can occur and there is data in the corresponding HARQ buffer, or (4) a PDCCH indicating a new transmission addressed to the C-RNTI of the UE has not been received after successful reception of a Random Access Response for the preamble not selected by the UE.

Figure 7:
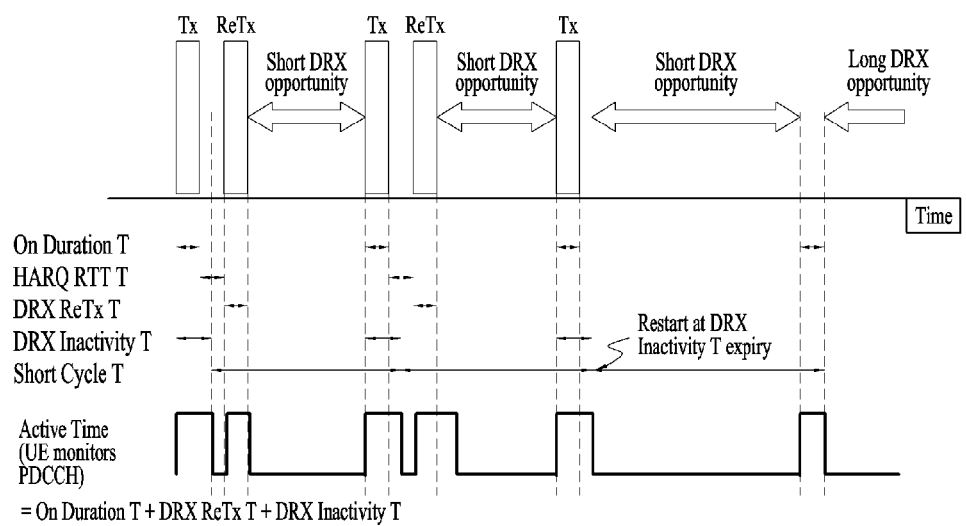
FIG. 7 is a diagram showing a method for a DRX operation in the LTE system.

FIG. 7 is a diagram showing a method for a DRX operation in the LTE system.

Referring to FIG. 7, the UE may be configured by RRC with a DRX functionality and shall perform following operations for each TTI (that is, each subframe).

If a HARQ RTT (Round Trip Time) Timer expires in this subframe and the data of the corresponding HARQ process was not successfully decoded, the UE shall start the drx-RetransmissionTimer for the corresponding HARQ process.

Further, if a DRX Command MAC control element (CE) is received, the UE shall stop onDurationTimer and drx-InactivityTimer. The DRX Command MAC CE is a command for shifting to a DRX state; and is identified by a LCID (Logical Channel ID) field of a MAC PDU (Protocol Data Unit) subheader.

Further, in case that drx-InactivityTimer expires or a DRX Command MAC CE is received in this subframe, if the Short DRX cycle is configured, the UE shall start or restart drxShortCycleTimer, and use the Short DRX Cycle. However, if the Short DRX cycle is not configured, the Long DRX cycle is used. Additionally, if drxShortCycleTimer expires in this subframe, the Long DRX Cycle is also used.

Furthermore, if the Short DRX Cycle is used and [(SFN*10)+subframe number] modulo (shortDRX-Cycle) is (drxStartOffset) modulo (shortDRX-Cycle), or if the Long DRX Cycle is used and [(SFN*10)+subframe number] modulo (longDRX-Cycle) is drxStartOffset, the UE shall start onDurationTimer.

The UE shall monitor the PDCCH for a PDCCH-subframe during the Active Time. If the PDCCH indicates a DL transmission or if a DL assignment has been configured for this subframe, the UE shall start the HARQ RTT Timer for the corresponding HARQ process and stop the drx-RetransmissionTimer for the corresponding HARQ process. If the PDCCH indicates a (DL or UL) new transmission, the UE shall start or restart drx-InactivityTimer.

Here, the PDCCH-subframe is defined as a subframe with PDCCH. That is, the PDCCH-subframe is a subframe on which the PDCCH can be transmitted. More specifically, in a FDD (frequency division duplex) system, the PDCCH-subframe represents any subframe. For full-duplex TDD (time division duplex) system, the PDCCH-subframe represents the union of downlink subframes and subframes including DwPTS of all serving cells, except serving cells that are configured with schedulingCellId (that is, the Scheduled cell). Here, the schedulingCellId indicates an identity of the scheduling cell. Further, for half-duplex TDD system, the PDCCH-subframe represents the subframes where the PCell (primary cell) is configured as a downlink subframe or a subframe including DwPTS.

Meanwhile, when not in Active Time, the UE does not perform a SRS (Sounding Reference Signal) transmission and a CSI reporting, which are triggered by the eNB.

During the above DRX operation, only the HARQ RTT Timer is fixed to 8 ms, whereas the eNB indicates the other timer values, onDurationTimer, drx-InactivityTimer, drx-RetransmissionTimer, and mac-ContentionResolutionTimer to the UE by an RRC signal. The eNB also indicates a long DRX cycle and a short DRX cycle, which represent the period of a DRX cycle, to the UE by an RRC signal.

As stated above, the present invention is directed to a PDCCH monitoring regardless of DRX configuration. More specifically, the above explained DRX configuration shall be ignored when specific conditions are met. One exemplary condition for ignoring DRX configuration is explained in view of handover (HO) operation.

The intra E-UTRAN HO of a UE in RRC_CONNECTED state is a UE-assisted network-controlled HO, with HO preparation signalling in E-UTRAN. Part of the HO command may come from the target eNB and may be transparently forwarded to the UE by the source eNB. To prepare the HO, the source eNB passes all necessary information to the target eNB (e.g. E-RAB attributes and RRC context). When CA (Carrier Aggregation) is configured and to enable SCell selection in the target eNB, the source eNB can provide in decreasing order of radio quality a list of the best cells and optionally measurement result of the cells.

Both the source eNB and UE may keep some context (e.g. C-RNTI) to enable the return of the UE in case of HO failure. UE may access the target cell via RACH following a contention-free procedure using a dedicated RACH preamble or following a contention-based procedure if dedicated RACH preambles are not available. The UE may use the dedicated preamble until the handover procedure is finished (successfully or unsuccessfully).

If the RACH procedure towards the target cell is not successful within a certain time, the UE initiates radio link failure recovery using a suitable cell. In this case, no ROHC context is transferred at handover, and ROHC context can be kept at handover within the same eNB.

Control Plane handling of HO is explained. The preparation and execution phase of the HO procedure may be performed without EPC involvement, i.e. preparation messages are directly exchanged between the eNBs. The release of the resources at the source side during the HO completion phase may be triggered by the eNB. In case an RN (Relay Node) is involved, its DeNB (Donor eNB) may relay the appropriate S1 messages between the RN and the MME (S1-based handover) and X2 messages between the RN and target eNB (X2-based handover); the DeNB may be explicitly aware of a UE attached to the RN due to the S1 proxy and X2 proxy functionality.

Figure 8:
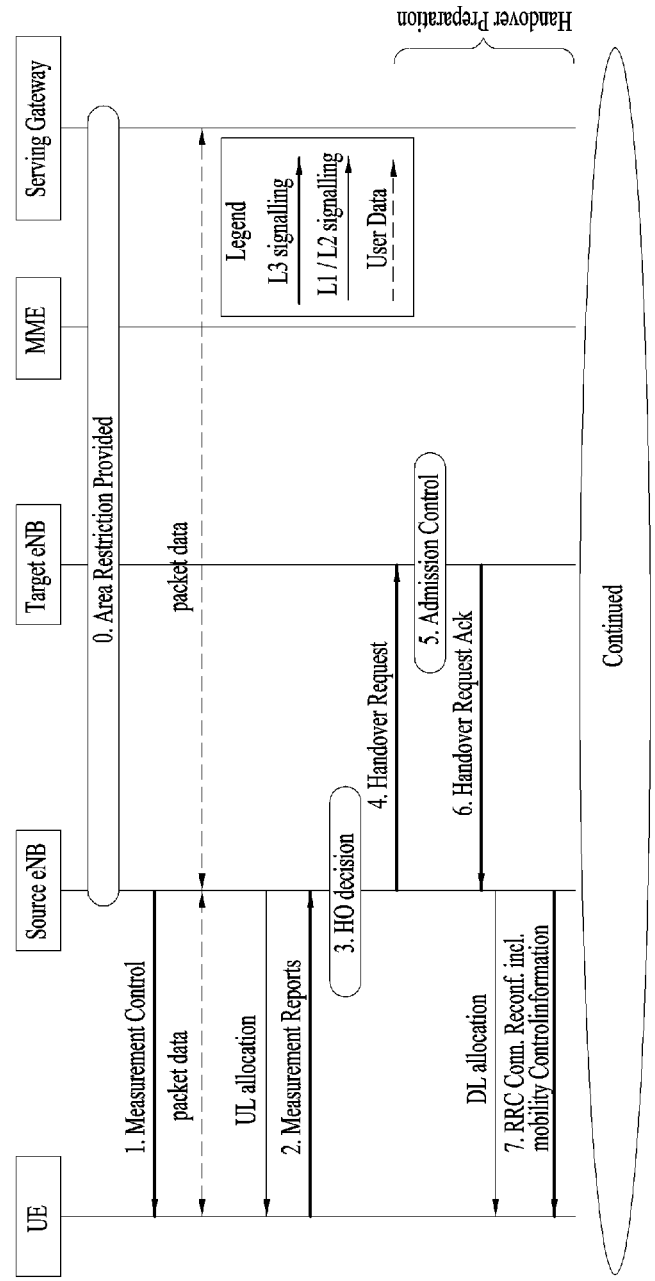
FIGS. 8-10 show the basic handover scenario where neither MME nor Serving Gateway changes.
Figure 9:
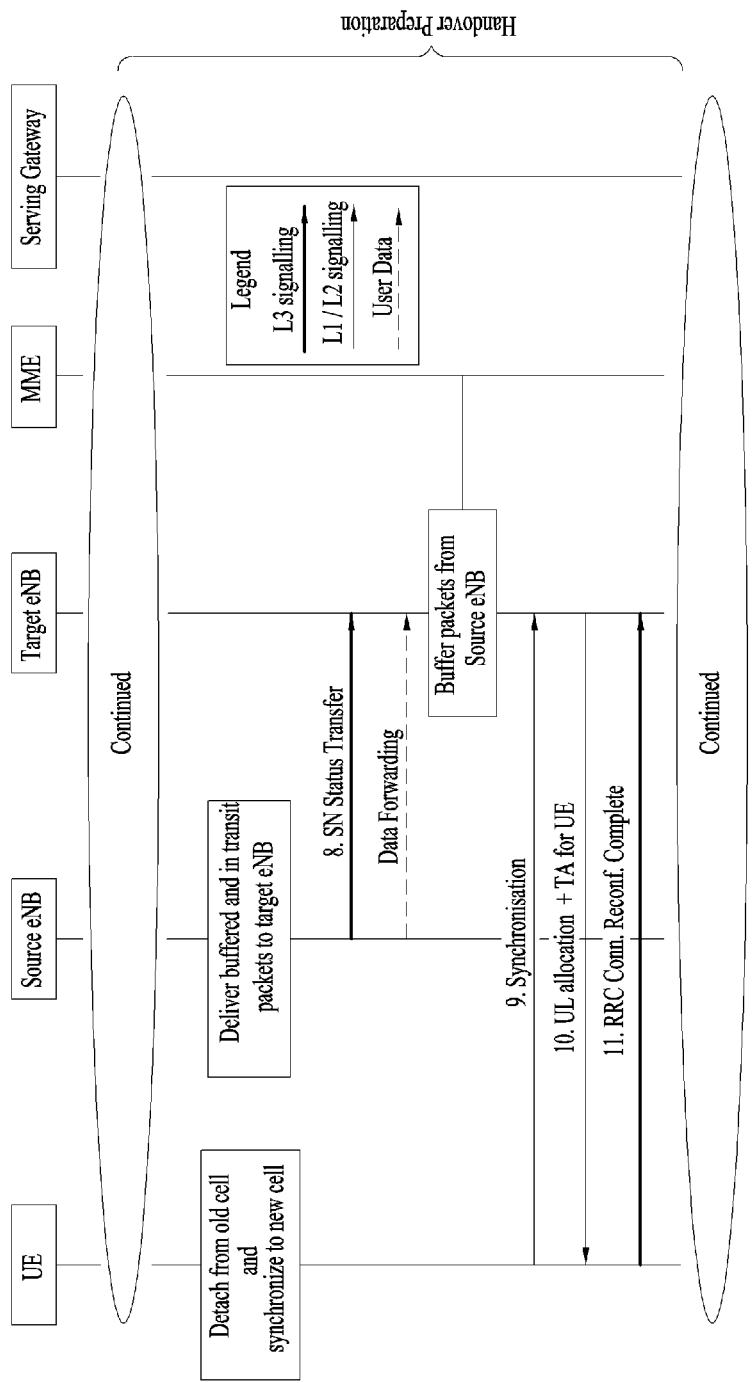
Figure 10:
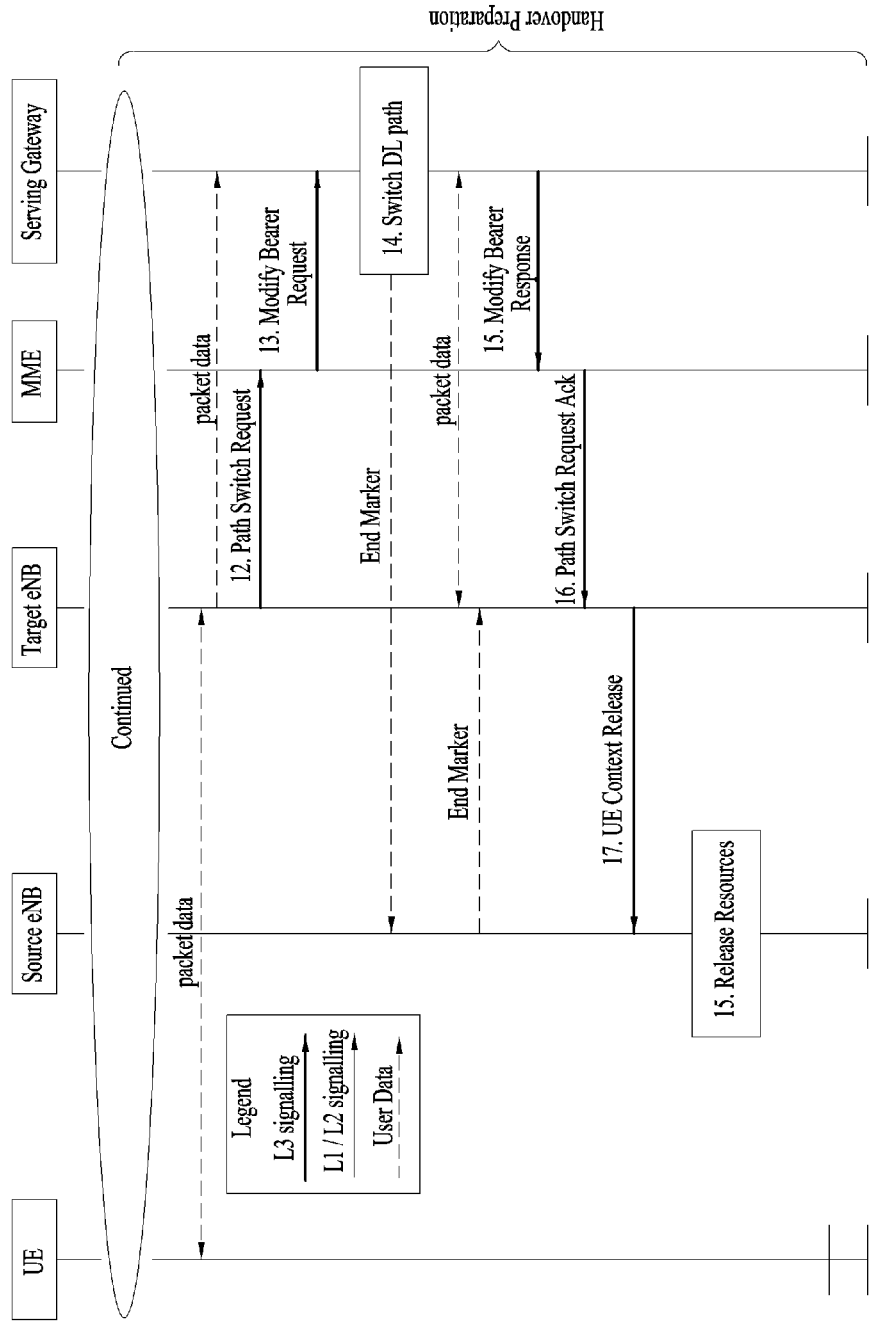

FIGS. 8-10 show the basic handover scenario where neither MME nor Serving Gateway changes.

Specifically, FIG. 8 shows the basic handover scenario until handover preparation is finished.

Step 0: The UE context within the source eNB contains information regarding roaming restrictions which were provided either at connection establishment or at the last TA update.

Step 1: The source eNB configures the UE measurement procedures according to the area restriction information. Measurements provided by the source eNB may assist the function controlling the UE's connection mobility.

Step 2: The UE may be triggered to send a measurement report by the rules set by i.e. system information, specification etc.

Step 3: The source eNB can make decision based on the measurement report and RRM information to hand off the UE.

Step 4: The source eNB can issue a HANDOVER REQUEST message to the target eNB passing necessary information to prepare the HO at the target side (UE X2 signalling context reference at source eNB, UE S1 EPC signalling context reference, target cell ID, $K_{eNB}^*$, RRC context including the C-RNTI of the UE in the source eNB, AS-configuration, E-RAB context and physical layer ID of the source cell+short MAC-I for possible RLF recovery). UE X2/UE S1 signalling references enable the target eNB to address the source eNB and the EPC. The E-RAB context may include necessary RNL and TNL addressing information, and QoS profiles of the E-RABs.

Step 5: Admission Control may be performed by the target eNB dependent on the received E-RAB QoS information to increase the likelihood of a successful HO, if the resources can be granted by target eNB. The target eNB may configure the required resources according to the received E-RAB QoS information and reserves a C-RNTI and optionally a RACH preamble. The AS-configuration to be used in the target cell can either be specified independently (i.e. an "establishment") or as a delta compared to the AS-configuration used in the source cell (i.e. a "reconfiguration").

Step 6: The target eNB may prepare HO with L1/L2 and sends the HANDOVER REQUEST ACKNOWLEDGE to the source eNB. The HANDOVER REQUEST ACKNOWLEDGE message may include a transparent container to be sent to the UE as an RRC message to perform the handover. The container may include a new C-RNTI, target eNB security algorithm identifiers for the selected security algorithms, may include a dedicated RACH preamble, and possibly some other parameters i.e. access parameters, SIBs, etc. The HANDOVER REQUEST ACKNOWLEDGE message may also include RNL/TNL information for the forwarding tunnels, if necessary.

As soon as the source eNB receives the HANDOVER REQUEST ACKNOWLEDGE, or as soon as the transmission of the handover command is initiated in the downlink, data forwarding may be initiated.

Steps 7 to 16 provide means to avoid data loss during HO.

Step 7: The target eNB may generate the RRC message to perform the handover, i.e RRCConnectionReconfiguration message including the mobilityControlInformation, to be sent by the source eNB towards the UE. The source eNB may perform the necessary integrity protection and ciphering of the message. The UE may receive the RRCConnectionReconfiguration message with parameters (i.e. new C-RNTI, target eNB security algorithm identifiers, and optionally dedicated RACH preamble, target eNB SIBS, etc.) and is commanded by the source eNB to perform the HO. The UE does not need to delay the handover execution for delivering the HARQ/ARQ responses to source eNB.

FIG. 9 is for handover execution part of the handover procedure.

Step 8: The source eNB may send the SN STATUS TRANSFER message to the target eNB to convey the uplink PDCP SN receiver status and the downlink PDCP SN transmitter status of E-RABs for which PDCP status preservation applies (i.e. for RLC AM). The uplink PDCP SN receiver status may include at least the PDCP SN of the first missing UL SDU and may include a bit map of the receive status of the out of sequence UL SDUs that the UE needs to retransmit in the target cell, if there are any such SDUs. The downlink PDCP SN transmitter status may indicate the next PDCP SN that the target eNB shall assign to new SDUs, not having a PDCP SN yet. The source eNB may omit sending this message if none of the E-RABs of the UE shall be treated with PDCP status preservation.

Step 9: After receiving the RRCConnectionReconfiguration message including the mobilityControlInformation, UE may perform synchronisation to target eNB and accesses the target cell via RACH, following a contention-free procedure if a dedicated RACH preamble was indicated in the mobilityControlInformation, or following a contention-based procedure if no dedicated preamble was indicated. UE may derive target eNB specific keys and may configure the selected security algorithms to be used in the target cell.

Step 10: The target eNB may respond with UL allocation and timing advance.

Step 11: When the UE has successfully accessed the target cell, the UE may send the RRCConnectionReconfiguration-Complete message (C-RNTI) to confirm the handover, along with an uplink Buffer Status Report, whenever possible, to the target eNB to indicate that the handover procedure is completed for the UE. The target eNB may verify the C-RNTI sent in the RRCConnectionReconfigurationComplete message. The target eNB can now begin sending data to the UE.

FIG. 10 is for explaining handover completion of the whole handover procedure.

Step 12: The target eNB may send a PATH SWITCH REQUEST message to MME to inform that the UE has changed cell.

Step 13: The MME may send a MODIFY BEARER REQUEST message to the Serving Gateway.

Step 14: The Serving Gateway may switch the downlink data path to the target side. The Serving gateway may send one or more "end marker" packets on the old path to the source eNB and then can release any U-plane/TNL resources towards the source eNB.

Step 15: The Serving Gateway may send a MODIFY BEARER RESPONSE message to MME.

Step 16: The MME may confirm the PATH SWITCH REQUEST message with the PATH SWITCH REQUEST ACKNOWLEDGE message.

Step 17: By sending the UE CONTEXT RELEASE message, the target eNB informs success of HO to source eNB and triggers the release of resources by the source eNB. The target eNB may send this message after the PATH SWITCH REQUEST ACKNOWLEDGE message is received from the MME.

Step 18: Upon reception of the UE CONTEXT RELEASE message, the source eNB can release radio and C-plane related resources associated to the UE context. Any ongoing data forwarding may continue.

When an X2 handover is used involving HeNBs and when the source HeNB is connected to a HeNB GW, a UE CONTEXT RELEASE REQUEST message including an explicit GW Context Release Indication may be sent by the source HeNB, in order to indicate that the HeNB GW may release of all the resources related to the UE context.

After UE reports measurement results to serving cell, reception of handover command can be delayed when the UE may go to sleep due to DRX. Considering that handover region of pico-to-macro handover is shorter than that of macro-to-macro handover, delayed reception of handover command due to DRX may increase handover failure rate in small cell deployments.

Therefore, one embodiment of the present invention proposes ignoring the DRX configuration even though the UE has received a DRX configuration information from the network, when a specific indication, such as the measurement results, is transmitted. The specific indication need not to be restricted to the measurement results, but can comprise any indication making immediate PDCCH monitoring be preferably.

In the exemplary embodiment regarding measurement report, after UE transmits measurement report to serving cell, the UE may keep monitoring PDCCH for a certain period or until it receives handover command from serving cell. To keep PDCCH monitoring after measurement reporting, UE can ignore DRX configuration or apply another DRX configuration which includes very long on-duration period.

In one example, the application of the above explained additional PDCCH monitoring operation can be limited to the case that the serving cell is certain type, e.g., pico cell, small cell or non-macro cell. For example, UE may keep monitoring the PDCCH after transmitting the measurement reporting only when the serving cell is small cell.

The application of the above explained additional PDCCH monitoring operation can be limited to the case that the target cell of measurement reporting is certain type. For example, UE may keep monitoring the PDCCH after transmitting the measurement reporting only when the target cell of the measurement reporting is macro cell.

The list of target cells which lead to keeping PDCCH monitoring can be signaled by serving cell. Then, UE may keep monitoring the PDCCH after transmitting the measurement reporting only when the measurement report is for the listed cells.

The above operation can be limited to the case that the measurement reporting is triggered by certain event. Measurement report triggering events includes:

Event A1: Serving becomes better than threshold
Event A2: Serving becomes worse than threshold
Event A3: Neighbour becomes offset better than PCell
Event A4: Neighbour becomes better than threshold
Event A5: PCell becomes worse than threshold1 and neighbour becomes better than threshold2
Event A6: Neighbour becomes offset better than SCell
Event B1: Inter RAT neighbour becomes better than threshold
Event B2: PCell becomes worse than threshold1 and inter RAT neighbour becomes better than threshold2

In one example, the UE may keeps monitoring the PDCCH after transmitting the measurement reporting only when the measurement report triggering event is A3 or A4. In another example, the measurement report triggering events which lead to keeping PDCCH monitoring can be signalled by serving cell.

Preferably, the period of time UE keeps monitoring PDCCH after measurement reporting can be configured by serving cell.

Figure 11:
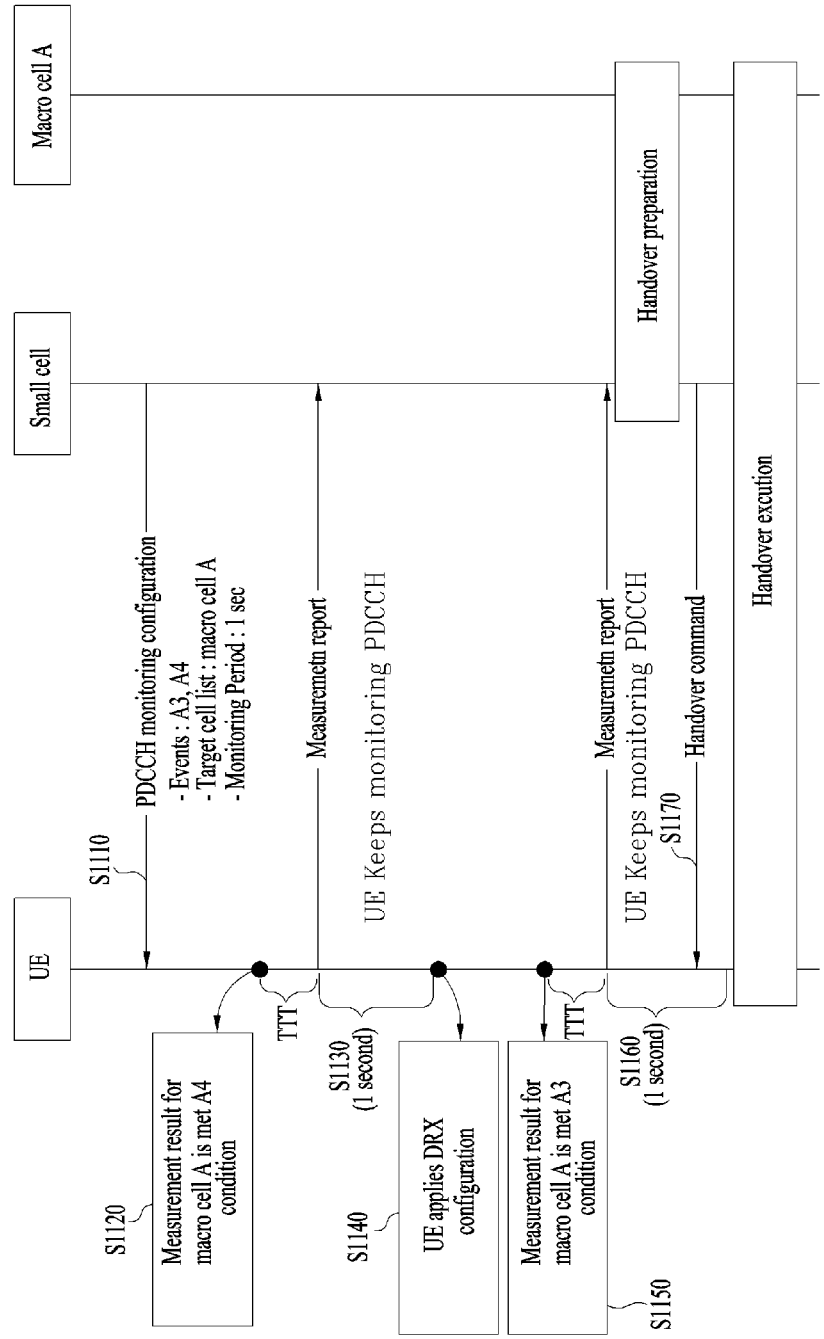
FIG. 11 shows one example of additional PDCCH monitoring according to one embodiment of the present invention.

FIG. 11 shows one example of additional PDCCH monitoring according to one embodiment of the present invention.

FIG. 11 is based on an exemplary situation where a serving cell is a small cell, such as a pico cell, and a target cell is a macro cell. The small serving cell may configure target cells list. In addition, according to the present embodiment, the small serving cell may additionally configure a measurement report triggering events (e.g. event A3 and A4) for the above explained keeping PDCCH monitoring regardless of the DRX configuration at the UE and a period (e.g. 1 sec) for keeping PDCCH monitoring for UE (S1110).

Based on this configuration, the UE may perform measurement on the target cells in the list. In this example, suppose that the measurement reporting for macro cell A is triggered by the specified event A4 (S1120).

In this case, the UE may transmit the measurement report to the serving cell. In addition, since the triggering event was the specified/predetermined one (event A4), the UE may keep monitoring the PDCCH and ignores the DRX configuration for specified period (e.g. one second) (S1130).

After the specified period of time (e.g. one second), if the UE did not receive the handover command, the UE may apply the DRX configuration (S1140).

In another instance, suppose that the measurement reporting for macro cell A is triggered by event A3 (S1140). In this case, the UE may transmit the measurement report to the serving cell and keeps monitoring the PDCCH and ignores the DRX configuration during the specified period of time (S1160). Upon finishing handover preparation, the serving small cell may transmit the handover command to UE without waiting due to DRX (S1170). By this operation, the handover execution will not be delayed due to the DRX configuration.

In another embodiment of the present invention, after the UE transmits measurement report to serving cell, the UE may perform additional monitoring of scheduling (e.g. PDCCH). To perform the additional monitoring after sending measurement reporting, UE can ignore DRX configuration (i.e. disable DRX) or apply another DRX configuration that can be applied temporarily, if available.

If UE did not receive any DL scheduling during the additional monitoring of scheduling, UE may stop the above explained additional monitoring of scheduling. Upon stopping the additional monitoring, the UE may fallback to its original DRX that was previously configured and applied before applying the additional monitoring of scheduling.

It is possible that network can configure whether UE should perform additional monitoring of DL scheduling (PDCCH monitoring).

(i) The configuration can be per UE, and in this case the configuration can be provided in radio resource configuration; or (ii) the configuration can be per measurement object, and in this case the configuration is provided within the concerned measurement object; or (iii) the configuration can be per measurement report configuration. For example the configuration can be towards a specific event used for triggering measurement report. In this case the configuration is provided within the concerned measurement report configuration.

It is also possible that a specific event used for triggering of measurement report is defined as a trigger of additional monitoring of scheduling. For example, UE may perform additional monitoring of scheduling after measurement reporting only when the measurement report triggering event is A3 or A4.

To control the additional monitoring of DL scheduling, network may provide the configuration parameters regarding the additional monitoring of DL scheduling. The parameters can include time duration for which the UE needs to keep additional monitoring of DL scheduling. The parameters can include temporal DRX parameters (including the normal DRX parameters and DRX off command). Upon meeting the condition that triggers the additional monitoring of DL scheduling, the UE applies temporal DRX parameters for pre-defined time (e.g. during the time duration for additional monitoring of DL scheduling)

It is also possible that network can configure a list of cells related to additional monitoring of scheduling. Upon receiving the list, UE may perform additional monitoring of scheduling only after sending measurement report that is triggered by one or more cells included in the list.

As stated above, this embodiment can be limited to the case that the neighbour cell that triggers the measurement reporting is certain type. For example, UE performs additional monitoring of scheduling (e.g. PDCCH) only after sending measurement report that is triggered by the 'macro' neighbor cell. This is beneficial to reduce X (any cell; don't care) to macro cell handover failure.

Also, the present embodiment can be limited to the case that the serving cell is certain type, e.g., pico cell, small cell or non-macro cell. For example, UE performs additional monitoring of scheduling (e.g. PDCCH) only after sending measurement report to non-macro (e.g. pico cell) serving cell.

Also, the present embodiment can be limited to the case that the serving cell and neighbour cell that jointly triggers the measurement reporting are certain type respectively. For example, UE performs additional monitoring of scheduling (e.g. PDCCH for DL scheduling) only after sending measurement report that is triggered by the 'macro' neighbor cell and 'pico' serving cell. This is beneficial to reduce pico to macro cell handover failure.

Figure 12:
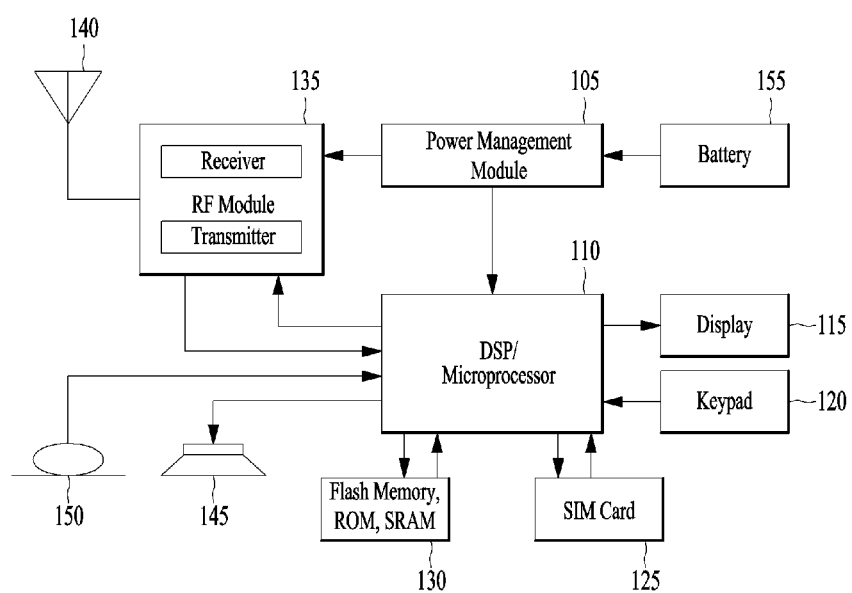
FIG. 12 is a block diagram of a communication apparatus according to an embodiment of the present invention.

FIG. 12 is a block diagram of a communication apparatus according to an embodiment of the present invention.

The apparatus shown in FIG. 12 can be a user equipment (UE) adapted to perform the above explaine PDCCH monitoring, but it can be any apparatus for performing the same operation.

As shown in FIG. 12, the apparatus may comprises a DSP/microprocessor (110) and RF module (transmiceiver; 135). The DSP/microprocessor (110) is electrically connected with the transciver (135) and controls it. The apparatus may further include power management module (105), battery (155), display (115), keypad (120), SIM card (125), memory device (130), speaker (145) and input device (150), based on its implementation and designer's choice.

Specifically, the transceiver (135) of this embodiment is adapted to receive DRX (Discontinuous Reception) configuration information from a network over the air. And, the processor (110) is adapted to control the transceiver (135) to ignore the DRX configuration information and monitor a PDCCH after transmitting a specific indication, is provided.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

INDUSTRIAL APPLICABILITY

While the above-described method has been described centering on an example applied to the 3GPP LTE system, the present invention is applicable to a variety of wireless communication systems in addition to the 3GPP LTE system.

The invention claimed is:

1. A method for a user equipment (UE) to operate in a wireless communication system, the method comprising:
receiving Discontinuous Reception (DRX) configuration information from a network;
receiving other configuration information for ignoring the DRX configuration information and monitoring a Physical Downlink Control Channel (PDCCH) from the network;
transmitting a specific indication; and
ignoring the DRX configuration information and monitoring the PDCCH after the transmitting the specific indication,
wherein the other configuration information comprises:
criteria for the specific indication, and
a time period for the ignoring the DRX configuration information and the monitoring the PDCCH.

2. The method of claim 1, wherein the monitoring the PDCCH is performed during a specified period of time in addition to an active time according to the DRX configuration information.

3. The method of claim 1, wherein the specific indication comprises a measurement report.

4. The method of claim 1, wherein the ignoring the DRX configuration information and the monitoring the PDCCH are performed only after transmitting a measurement report triggered by a specific type of neighbor cell.

5. The method of claim 4, wherein the specific type of neighbor cell is configured by the network through a Radio Resource Control (RRC) signal.

6. The method of claim 1, wherein the ignoring the DRX configuration information and the monitoring the PDCCH are performed only after transmitting a measurement report triggered by at least one specific measurement object.

7. The method of claim 6, wherein the at least one specific measurement object is configured by the network through a Radio Resource Control (RRC) signal.

8. The method of claim 1, wherein the ignoring the DRX configuration information and the monitoring the PDCCH are performed only after transmitting a measurement report to a specific type of serving cell.

9. The method of claim 8, wherein the specific type of serving cell is configured by the network through a Radio Resource Control (RRC).

10. The method of claim 1, wherein the ignoring the DRX configuration information and the monitoring the PDCCH are performed only after transmitting a measurement report triggered by a specific type of neighbor cell to a specific type of serving cell.

11. The method of claim 10, wherein the specific type of neighbor cell and the specific type of serving cell are configured by the network through a Radio Resource Control (RRC) signal.

12. The method of claim 1, wherein the ignoring the DRX configuration infoitnation and the monitoring the PDCCH are performed only after transmitting a measurement report triggered by a specific measurement report triggering event.

13. The method of claim 1, wherein the DRX configuration information is for an on-duration timer, a DRX inactivity timer, and a DRX retransmission timer.

14. A user equipment (UE) for operating in a wireless communication system, the UE comprising:
a transceiver configured to receive Discontinuous Reception (DRX) configuration information, and other configuration information for ignoring the DRX configuration information and monitoring a Physical Downlink Control Channel (PDCCH) from a network; and
a processor connected to the transceiver,
wherein the processor is configured to:
control the transceiver to transmit a specific indication, and
ignore the DRX configuration information and monitor the PDCCH after the transceiver transmits the specific indication,
wherein the other configuration information comprises:
criteria for the specific indication, and
a time period for the ignoring the DRX configuration information and the monitoring the PDCCH.

* * * * *